(12) United States Patent
Urano et al.

(10) Patent No.: US 11,041,815 B2
(45) Date of Patent: Jun. 22, 2021

(54) INSPECTION INFORMATION GENERATION DEVICE, INSPECTION INFORMATION GENERATION METHOD, AND DEFECT INSPECTION DEVICE

(71) Applicant: HITACHI HIGH-TECH CORPORATION, Tokyo (JP)

(72) Inventors: Takahiro Urano, Tokyo (JP); Toshifumi Honda, Tokyo (JP); Takashi Hiroi, Tokyo (JP); Nobuaki Hirose, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 135 days.

(21) Appl. No.: 16/099,654

(22) PCT Filed: May 23, 2016

(86) PCT No.: PCT/JP2016/065112
§ 371 (c)(1),
(2) Date: Nov. 7, 2018

(87) PCT Pub. No.: WO2017/203554
PCT Pub. Date: Nov. 30, 2017

(65) Prior Publication Data
US 2019/0154593 A1    May 23, 2019

(51) Int. Cl.
*G01N 21/956* (2006.01)
*G01N 21/95* (2006.01)
*G01N 21/88* (2006.01)

(52) U.S. Cl.
CPC ....... *G01N 21/956* (2013.01); *G01N 21/8806* (2013.01); *G01N 21/9501* (2013.01);
(Continued)

(58) Field of Classification Search
CPC .. G06T 7/001; G01N 21/956; G01N 21/8806; G01N 21/9501; G01N 21/95607; G01N 21/8822
(Continued)

(56) References Cited

U.S. PATENT DOCUMENTS 6,411,377 B1    6/2002 Noguchi et al.
8,467,594 B2 *  6/2013 Sakai et al. .......... G01N 21/956
                                                    382/149

(Continued)

FOREIGN PATENT DOCUMENTS

| JP | 2000-105203 A | 4/2000 |
| JP | 2002-313861 A | 10/2002 |
| JP | 2008185514 A | 8/2008 |
| JP | 2010-529684 A | 8/2010 |
| JP | 2012-063209 A | 3/2012 |
| KR | 20120099481 A | 9/2012 |

OTHER PUBLICATIONS

Bessas, I.L., C. Pádua, F.L., de Assis, G.T. et al. Automatic and online setting of similarity thresholds in content-based visual information retrieval problems. EURASIP J. Adv. Signal Process. 2016, 32 (2016). https://doi.org/10.1186/s13634-016-0324-4 published date Mar. 8, 2016 (Year: 2016).*

(Continued)

*Primary Examiner* — Siamak Harandi
(74) *Attorney, Agent, or Firm* — Miles & Stockbridge, P.C.

(57) ABSTRACT

An inspection information generation device includes a design information acquirer configured to acquire design information of a sample to be inspected, a candidate region extractor configured to use the design information to extract multiple candidate regions, an image capturer configured to capture images of the multiple candidate regions, a similarity calculator configured to use the images of the multiple candidate regions to calculate a similarity or distance between the multiple candidate regions, and a region deter- (Continued)

miner configured to use the similarity or the distance to determine, as inspection information, at least one reference region corresponding to a region to be inspected.

13 Claims, 13 Drawing Sheets

(52) U.S. Cl.
CPC ............... *G01N 21/95607* (2013.01); *G01N 2021/8822* (2013.01)

(58) Field of Classification Search
USPC .................................................. 382/149, 145
See application file for complete search history.

(56) References Cited

U.S. PATENT DOCUMENTS

| | | | |
|---|---|---|---|
| 2002/0150286 A1 | 10/2002 | Onishi | |
| 2004/0066962 A1* | 4/2004 | Sasa et al. | G06T 7/001 |
| 2008/0306701 A1 | 12/2008 | Zhong et al. | |
| 2012/0294507 A1* | 11/2012 | Madea et al. | G01N 21/9501 |
| | | | 382/149 |
| 2013/0329039 A1 | 12/2013 | Sakai | |
| 2014/0375793 A1* | 12/2014 | Harada et al. | G06T 7/001 |

OTHER PUBLICATIONS

Office Action dated Dec. 16, 2019 in corresponding Korean Application No. 10-2018-7027971.

\* cited by examiner

INSPECTION INFORMATION GENERATION DEVICE, INSPECTION INFORMATION GENERATION METHOD, AND DEFECT INSPECTION DEVICE

TECHNICAL FIELD

The present invention relates to an inspection information generation device, an inspection information generation method, and a defect inspection device.

BACKGROUND ART

Thin-film devices such as semiconductor wafers, liquid crystal displays, and hard disk magnetic heads are manufactured via a large number of processing processes. In the manufacture of such thin-film devices, appearance inspection is performed for each of a series of processes for the purposes of yield improvement and stabilization.

Patent Literature 1 discloses a method for detecting, based on a reference image and an image to be inspected, a defect on a surface of an object that is to be inspected and in which multiple structural objects having substantially the same shape are arrayed. In addition, Patent Literature 2 discloses a method that achieves high sensitivity by combining a die comparison scheme for selecting a reference image from an adjacent die and a cell comparison scheme for performing selection from a periodic pattern. In addition, Patent Literature 3 discloses a method for inspecting a repetitive pattern portion identified using design information with high sensitivity. Furthermore, Patent Literature 4 discloses a method that achieves high sensitivity by comparing multiple cores formed within a die and having the same layout.

CITATION LIST

Patent Literature

Patent Literature 1: Japanese Unexamined Patent Application Publication No. 2000-105203
Patent Literature 2: Japanese Unexamined Patent Application Publication No. 2002-313861
Patent Literature 3: Japanese Unexamined Patent Application Publication No. 2012-063209
Patent Literature 4: Japanese Unexamined Patent Application Publication (Translation of PCT Application) No. 2010-529684

SUMMARY OF INVENTION

Technical Problem

In a semiconductor wafer to be inspected, a difference between local brightness in images of adjacent dies may occur due to a slight difference between thicknesses, a variation in widths of patterns, a variation in surface roughness, and the like, which are caused by planarization by CMP (Chemical Mechanical Polishing) or the like. To avoid this, a conventional scheme has handled the aforementioned difference between the local brightness by using a region formed within a die and having a similar layout as a reference image.

To set the region to be used as the reference image and having the similar layout, design information of the semiconductor wafer is used. However, even when the similar layout exists in the design information, captured images may not be similar. For example, an optical wafer inspecting device may be easily affected by scattered light from a lower layer pattern or a peripheral pattern. In this case, images obtained in defect detection may not be similar to each other, and erroneous, information may be generated or a defect may be overlooked.

The present invention provides a technique for appropriately setting a region to be used as a reference image in consideration of the aforementioned problems.

Solution to Problem

For example, to solve the aforementioned problems, configurations described in the appended claims are used. The present application includes multiple sections for solving the aforementioned problems. However, as an example of them, an inspection information generation device is provided, which includes a processor configured to acquire design information of a sample to be inspected, extract multiple candidate regions using the acquired design information, capture images of the multiple candidate regions, perform a similarity calculation using the extracted images of the multiple candidate regions by calculating a distance between the multiple candidate regions; and determine, as inspection information, one or more reference regions each corresponding to a same region to be inspected based on the similarity or the distance in which a minimum number specifying how many of said one or more reference regions is to be determined for said region to be inspected is received via user input, and in which the processor is further configured to extract, as the inspection information, a partial image in or near the region to be inspected and a partial image existing in or near the reference region, each partial image having an area less than the region to be inspected and including one or more edge patterns of the region to be inspected.

In addition, in another example, a defect inspection device is provided, which includes the inspection information generation device, a storage device configured to store the inspection information, and a second processor configured to perform defect detection. The first processor is further configured to use the inspection information to capture a first image of the region to be inspected and a second image of the one or more reference regions, and the second processor is further configured to use the first image and the second image to perform the defect detection.

In addition, in another example, an inspection information generation method is provided, which includes a step of acquiring design information of a sample to be inspected, a step of extracting multiple candidate regions using the design information, a step of capturing images of the multiple candidate regions, a step of calculating a similarity using the images of the multiple candidate regions to calculate a similarity or distance between the multiple candidate regions, and a step of determining, as inspection information, one or more reference regions each corresponding to a region to be inspected using the similarity or distance, in which the step of extracting multiple design candidate region further includes extracting, as the inspection information, a partial image existing in or near the region to be inspected and a partial image existing in or near the reference region, each partial image having an area less than the region to be inspected and including one or more edge patterns of the region to be inspected and in which a minimum number specifying how many of said one or more reference regions is to be determined for said region to be inspected is received via user input.

Advantageous Effects of Invention

According to the present invention, a region to be used as a reference image can be appropriately set. Characteristics related to the present invention are clarified from the present description and the accompanying drawings. In addition, challenges, configurations, and effects other than the aforementioned description are clarified by a description of the following embodiments.

DESCRIPTION OF EMBODIMENTS

Hereinafter, embodiments of the present invention are described With reference to the accompanying drawings. The embodiments described below are examples and can be modified within the gist of the present invention. In addition, a characteristic shown in a drawing or described together with a single exemplary aspect may be combined with a characteristic of another aspect.

First Embodiment

A first embodiment of a defect inspection technique (defect inspection method and defect inspection device) according to the present invention is described below with reference to FIGS. 1 to 9. In the present embodiment, as an example of a pattern inspection technique, a defect inspection device and a defect inspection method, which use dark-field illumination to be performed on a semiconductor wafer, are described.

Figure 1:
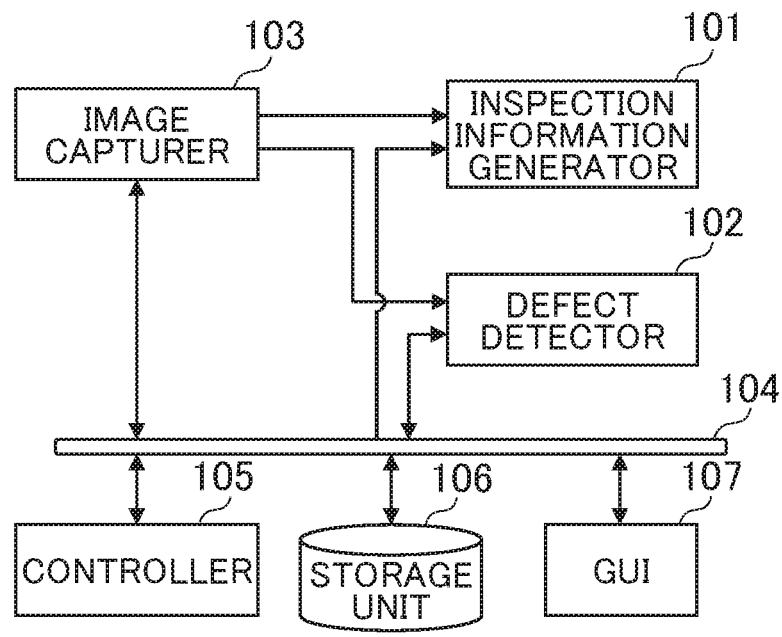
FIG. 1 is a diagram showing an example of a configuration of a defect inspection device.

FIG. 1 is a diagram showing an example of a configuration of the defect inspection device. The defect inspection device is a device configured to inspect a fine defect existing on a sample surface. The defect inspection device includes an inspection information generator 101, a defect detector 102, an image capturer 103, a communication bus 104, a controller 105, a storage unit 106, and a GUI (Graphical User Interface) 107.

The inspection information generator 101 is a processing unit configured to generate inspection information. The image captures 103 captures an image of a sample surface. The defect detector 102 s a processing unit configured to use an image (first image) of a region to be inspected and an image (second image) of a reference image to detect a defect on a sample surface. The controller 105 is a processing unit configured to control the aforementioned constituent units of the defect inspection device.

The processing units 101, 102, and 105 may be configured in a general-purpose computer (information processing device). The information processing device may include a central processing unit, an auxiliary storage device, and a main storage device. For example, the central processing unit is a processor such as a CPU (Central Processing Unit). For example, the auxiliary storage device is a hard disk, and the main storage device is a memory. Processes of the processing units 101, 102, and 105 may be executed by storing program codes corresponding to the processes in the memory and causing the processor to execute the program codes.

The inspection information generator 101 receives design information of a sample to be inspected from the storage unit 106 via the communication bus 104. The inspection information generator 101 extracts multiple candidate regions. The multiple candidate regions include a candidate of a region to be inspected and multiple candidate reference regions. The inspection information generator 101 determines at least one reference region that is among the multiple candidate regions and corresponds to the region to be inspected, based on a similarity calculated using images acquired from the image capturer 103 and indicating the multiple candidate regions.

The GUI 107 includes an input device such as a mouse or a keyboard and an output device such as a display. A user can confirm information of the determined reference region, the similarity, and the like via the GUI 107 and modify the information via the GUI 107 if necessary. The information of a combination of the determined region to be inspected and the determined reference region is stored as inspection information in the storage unit 106.

The defect detector 102 receives the images acquired by the image capturer 103 and uses the inspection information stored in the storage unit 106 to detect a defect from results of comparing the image of the region to be inspected with the image of the reference image. The user can confirm the result of detecting the defect via the GUI 107.

The inspection information generator 101 and the defect detector 102 may be enabled as the same hardware or may be enabled as separate hardware portions.

Figure 2:
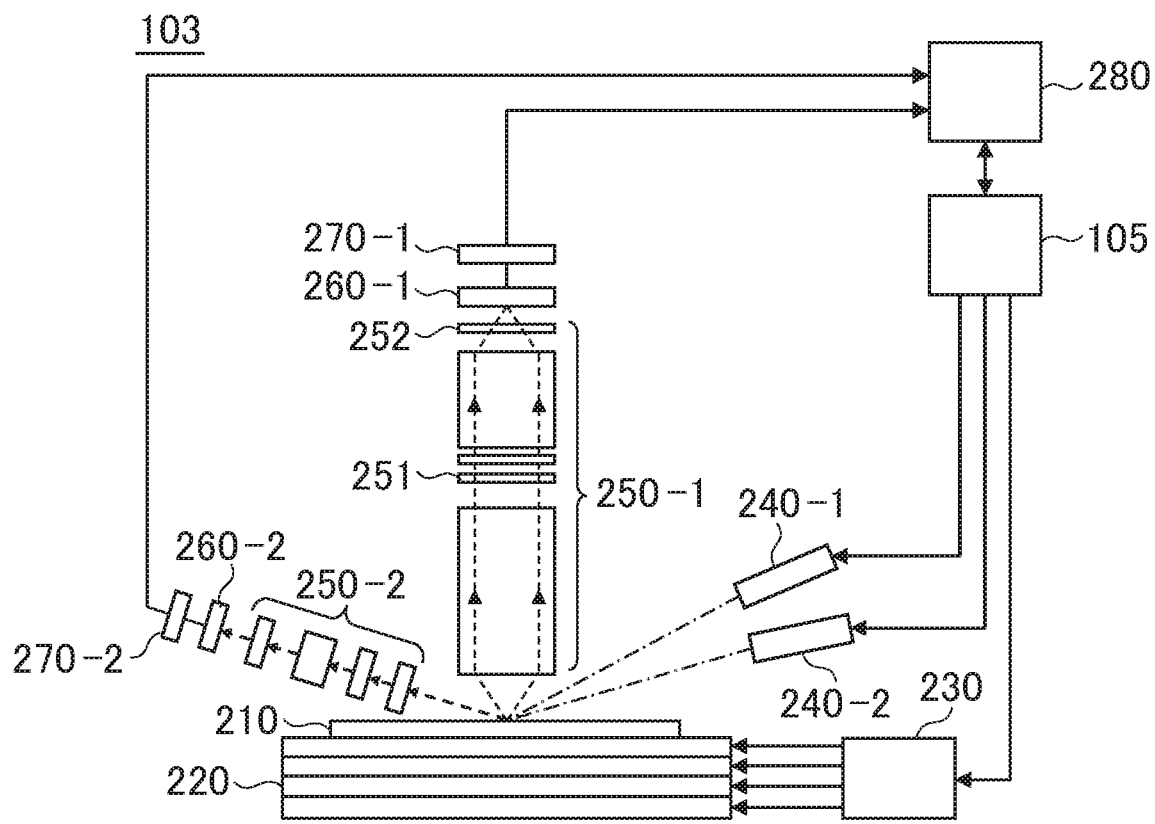
FIG. 2 is a diagram showing an example of a configuration of an image capturer that uses dark-field illumination.

FIG. 2 is a diagram showing an example of a configuration of the image capturer 103 that uses the dark-field illumination. The image capturer 103 includes a stage 220, a mechanical controller 230, an illumination optical system (illuminators 240-1 and 240-2), a detection optical system (upward detection system 250-1 and oblique detection system 250-2), image sensors 260-1 and 260-2, AD circuits 270-1 and 270-2, and an image buffer 280.

The upward detection system 250-1 includes a spatial frequency filter 251 and an analyzer 252. A sample 210 is an object to be inspected such as a semiconductor wafer. The sample 210 is placed on the stage 220. The stage 220 is capable of moving in an X plane, rotating (at θ), and moving in a Z direction (direction perpendicular to the XY plane). The mechanical controller 230 is a controller configured to drive the stage 220.

The sample 210 is illuminated with light emitted by the illuminators 240-1 and 240-2 under control by the controller 105. The upward detection system 250-1 and the oblique detection system 250-2 receive light scattered from the sample 210 to form images. The formed optical images are received by the image sensors 260-1 and 260-2, respectively. Signals of the image sensors 260-1 and 260-2 are converted to digital signals via the AD circuits 270-1 and 270-2. The converted digital signals are stored as image signals in the image buffer 280. The inspection information generator 101 and the defect detector 102 can acquire the images captured by the image capturer 103.

In this case, the sample 210 is placed on the stage 220 that is driven to move in the XY plane, rotate at θ, and move in the Z direction. While the mechanical controller 230 drives the stage 220 in X and Y directions, the upward detection system 250-1 and the oblique detection system 250-2 detect the scattered light. By performing this, a two-dimensional image of the sample 210 is obtained.

Illumination light sources of the illuminators 240-1 and 240-2 may be lasers or lamps. In addition, wavelengths of the illumination light sources may be short wavelengths or wavelengths of light (white light) in a wide band. When light of a short wavelength is used, light (ultraviolet light (UV light)) of a wavelength in an ultraviolet band may be used in order to increase the resolution of an image to be detected (or detect a fine defect). When lasers are used as the light sources and are configured to emit light of short wavelengths, units for reducing coherence may be included in the illuminators 240-1 and 240-2, respectively.

As the image sensors 260-1 and 260-2, time delay integration image sensors (TDI image sensors), each of which is configured by two-dimensionally arraying multiple one-dimensional image sensors, may be used. A two-dimensional image may be obtained with high sensitivity at a relatively high speed by transferring signals detected by one-dimensional image sensors in synchronization with a movement of the stage 220 to one-dimensional image sensors located at the next stage and summing the signals. As the TDI image sensors, parallel output type sensors, each of which includes multiple output taps, may be used. In this case, output from the sensors can be processed in parallel and high-speed detection can be performed. In addition, as the image sensors 260-1 and 260-2, backside illumination sensors may be used. In this case, the efficiency of the detection can be improved, compared with the case where front-side illumination sensors are used.

Figure 3:
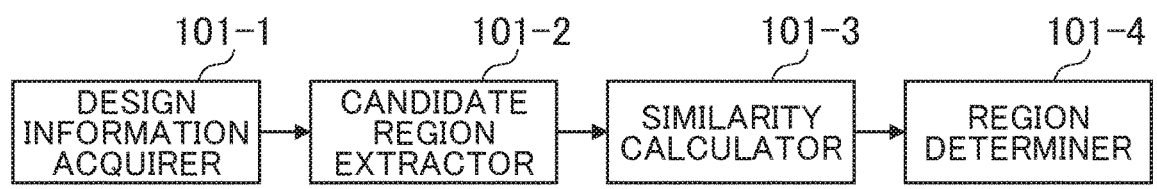
FIG. 3 is a diagram showing an example of a configuration of an inspection information generator.

FIG. 3 is a diagram showing an example of a configuration of the inspection information generator 101. The inspection information generator 101 includes a design information acquirer 101-1, a candidate region extractor 101-2, a similarity calculator 101-3, and a region determiner 101-4.

The design information acquirer 101-1 acquires the design information stored in the storage unit 106 and indicating the sample to be inspected and transfers the design information to the candidate region extractor 101-2. The candidate region extractor 101-2 extracts multiple regions having a repetitive pattern as candidate regions from the design information. The extracted repetitive pattern may be a pattern of a memory cell or the like in which intervals between repetitive portions are relatively short or the repetitive pattern may be a pattern of a peripheral circuit portion and logic region in which intervals between repetitive portions are relatively long. In addition, the extracted pattern may be a non-repetitive pattern as long as multiple regions of the same pattern exist.

The image capturer 103 receives information of multiple candidate regions from the candidate region extractor 101-2 and captures images of the multiple candidate regions. The similarity calculator 101-3 receives the images of the multiple candidate regions from the image capturer 103 and calculates a similarity between the multiple candidate regions. The similarity calculator 101-3 calculates the similarity using the images captured by the image capturer 103 and corresponding to the multiple candidate regions. The similarity is calculated from the root mean square (RMS) between the multiple candidate regions, normalized cross-correlation (NCC) between the multiple candidate regions, or the like. In addition, in another example, at least one characteristic point may be determined based on information of edges extracted from the images of the candidate regions or the like, regions may be limited to peripheral regions of the determined characteristic point, and the similarity between the regions may be calculated. In addition, as a process to be performed before the calculation of the similarity, the positioning of the images of the multiple candidate regions may be performed to correct a positional shift between the captured images of the multiple candidate regions.

The region determiner 101-4 determines, as a reference region, at least one region that corresponds to any region to be inspected, from among the multiple candidate regions, based on the similarity between the multiple candidate regions, the similarity being received from the similarity calculator 101-3. The region determiner 101-4 may select reference regions in descending order of similarity. In addition, the region determiner 101-4 may select, from among multiple candidate regions having similarities equal to or higher than a predetermined value, reference regions in ascending order of distance. In addition, the reference region may be selected from among candidate regions of a die different from a die including the region to be inspected. Furthermore, when a candidate region corresponding to the region to be inspected does not exist (or when the region to be inspected is a unique pattern in a die), or when a candidate region having a similarity equal to or larger than the predetermined value does not exist, a reference region may be selected from a region in an adjacent die, the region being at the same position as the region to be inspected. Furthermore, when the image capturer 103 includes the multiple detection optical systems 250-1 and 250-2, different reference regions may be selected for the detection optical systems, respectively.

In addition, the reference region corresponding to the region to be inspected may be displayed in the GUI 107. The user may confirm and modify the reference region via the GUI 107. The region determiner 101-4 causes information of a combination of the reference region and the region to be inspected to be stored in the storage unit 106. The inspection information includes positional and shape information of the region to be inspected and the reference region. The inspection information is stored in the storage unit 106 in any forms such as text coordinate data and image data. The similarity calculator 101-3 may cause the calculated similarity between the multiple candidate regions to be stored in the storage unit 106.

Figure 4:
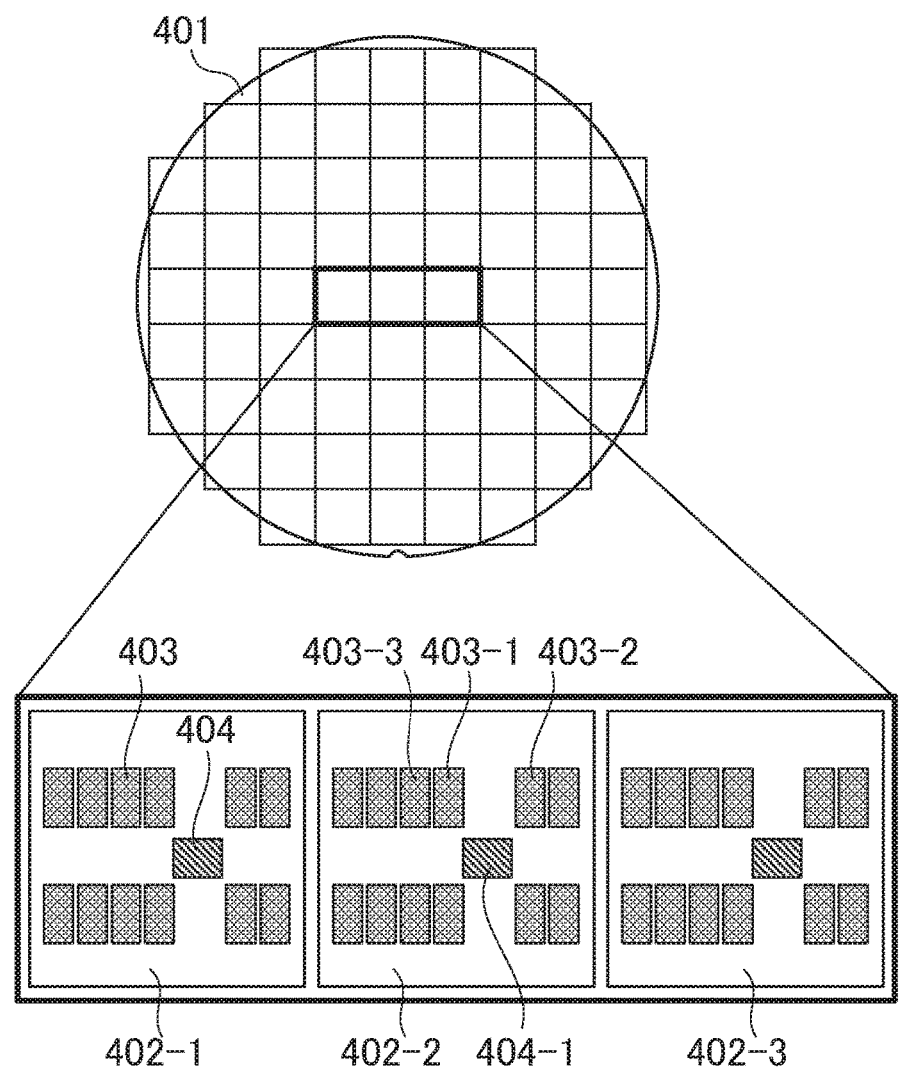
FIG. 4 is a diagram showing an example of candidate regions extracted by a candidate region extractor.

FIG. 4 is a diagram showing an example of the candidate regions extracted by the candidate region extractor 101-2. Dies 402-1, 402-2, and 402-3 having the same pattern exist on a sample 401 shown in FIG. 4. The candidate region extractor 101-2 uses design information to extract multiple candidate regions 403-1, 403-2, and 403-3 having the same pattern in the die. This case assumes that similarities between the region 403-1 serving as a region to be inspected and the candidate regions 403-2 and 403-3 are high. In this case, the region determiner 101-4 determines, as reference regions, the candidate regions 403-2 and 403-3 for the region 403-1 to be inspected.

In the example shown in FIG. 4, a region 404 having a unique pattern is included in the die 402-1. When the region 404 is to be inspected, the region determiner 101-4 may determine, as a reference region, a region 404-1 located at the same position in the adjacent die 402-2.

Figure 5A:
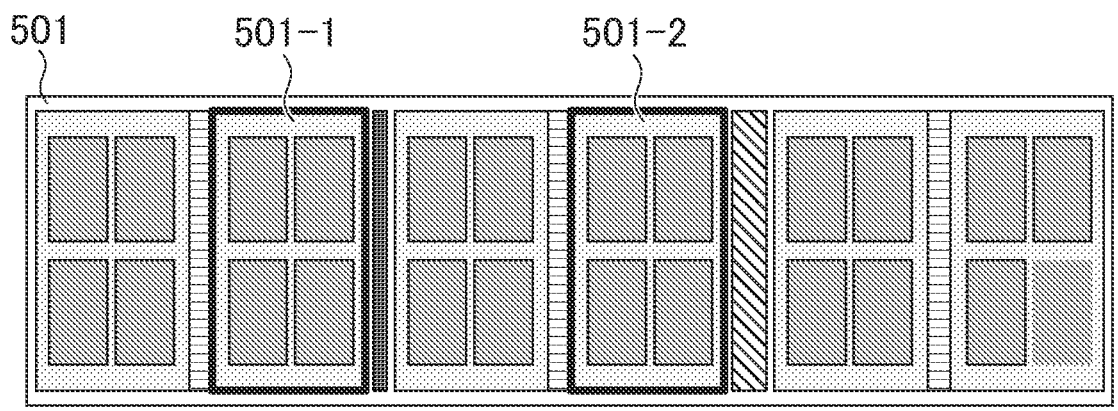
FIG. 5A is a diagram showing an example of design information.
Figure 5B:
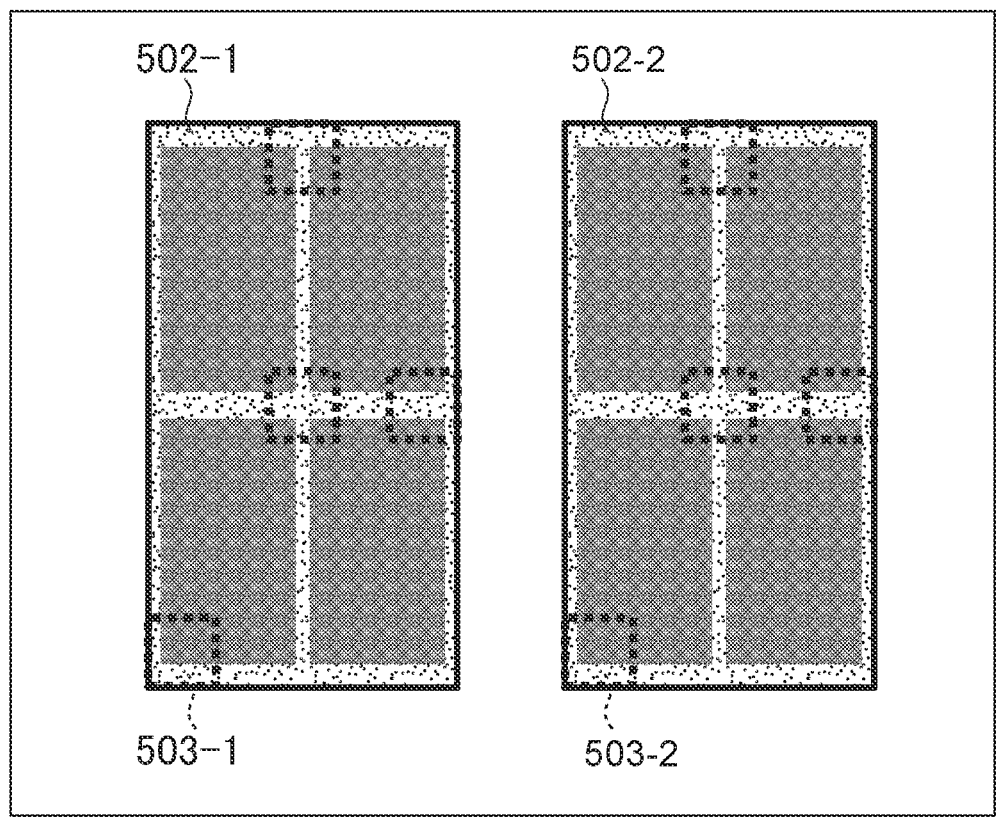
FIG. 5B is a diagram showing an example of captured images of candidate regions.

FIG. 5A shows an example of the design information acquired by the design information acquirer 101-1 and an example of the candidate regions, while FIG. 5B shows an example of captured images of positions corresponding to the candidate regions.

501 indicates design information corresponding to any region in a die. The design information is input in any form such as text coordinate data, GDS data, OASIS data, HSS data, image data, or the like. For example, it is assumed that the candidate region extractor 101-2 extracts regions 501-1 and 501-2 as candidate regions. An image 502-1 is an example of an image captured by imaging a position corresponding to the region 501-1 by the image capturer 103, while an image 502-2 is an example of an image captured by imaging a position corresponding to the region 501-2 by the image capturer 103.

The similarity calculator 101-3 may use the entire images 502-1 and 502-2 to calculate a similarity between the candidate regions. In addition, as another example, the similarity calculator 101-3 may use multiple partial regions 503-1 and 503-2 within the images 502-1 and 502-2 to calculate the similarity between the candidate regions.

Figure 6:
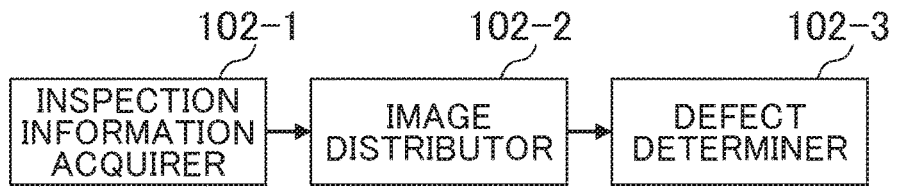
FIG. 6 is a diagram showing an example of a configuration of a defect inspector.

FIG. 6 is a diagram showing an example of a configuration of the defect detector 102. The defect detector 102 includes an inspection information acquirer 102-1, an image distributor 102-2, and a defect determiner 102-3.

The inspection information acquirer 102-1 acquires the inspection information (inspection information generated by the inspection information generator 101) stored in the storage unit 106. The image distributor 102-2 extracts, based on the inspection information, an image corresponding to the region to be inspected and an image of the reference region corresponding to the region to be inspected, from the images captured by the image capturer 103. The image distributor 102-2 transfers the extracted image of the region to be inspected and the extracted image of the reference region to the defect determiner 102-3.

The defect determiner 102-3 uses the received image of the region to be inspected and the received image of the reference region to perform defect determination. The defect determiner 102-3 positions the image of the region to be inspected and the image of the reference region on a pixel basis or on a subpixel basis. After that, the defect determiner 102-3 calculates a difference between the image of the region to be inspected and the image of the reference region and determines whether or not the difference value is equal to or larger than a predetermined threshold. When the difference value is equal to or larger than the predetermined threshold, the defect determiner 102-3 detects a corresponding portion as a defect. In this case, the defect determiner 102-3 may generate an average reference image (golden image) from images of multiple reference regions and perform the defect determination using a difference between the average reference image and the image of the region to be inspected. In addition, the defect determiner 102-3 may perform the defect determination by synthesizing images obtained by the multiple detection optical systems and indicating the region to be inspected and synthesizing images obtained by the multiple detection optical systems and indicating the reference region.

The defect determiner 102-3 may correct shifts between the region to be inspected and the reference region and actually captured images.

The defect determiner 102-3 may be composed of multiple arithmetic units. The image distributor 102-2 may divide each of the image of the region to be inspected and the image of the reference region into multiple portions and distribute the divided portions to the arithmetic units. In this case, the image distributor 102-2 distributes portions corresponding to each other and included in both of the image of the region to be inspected and the image of the reference region to the same arithmetic unit (processor).

Figure 7:
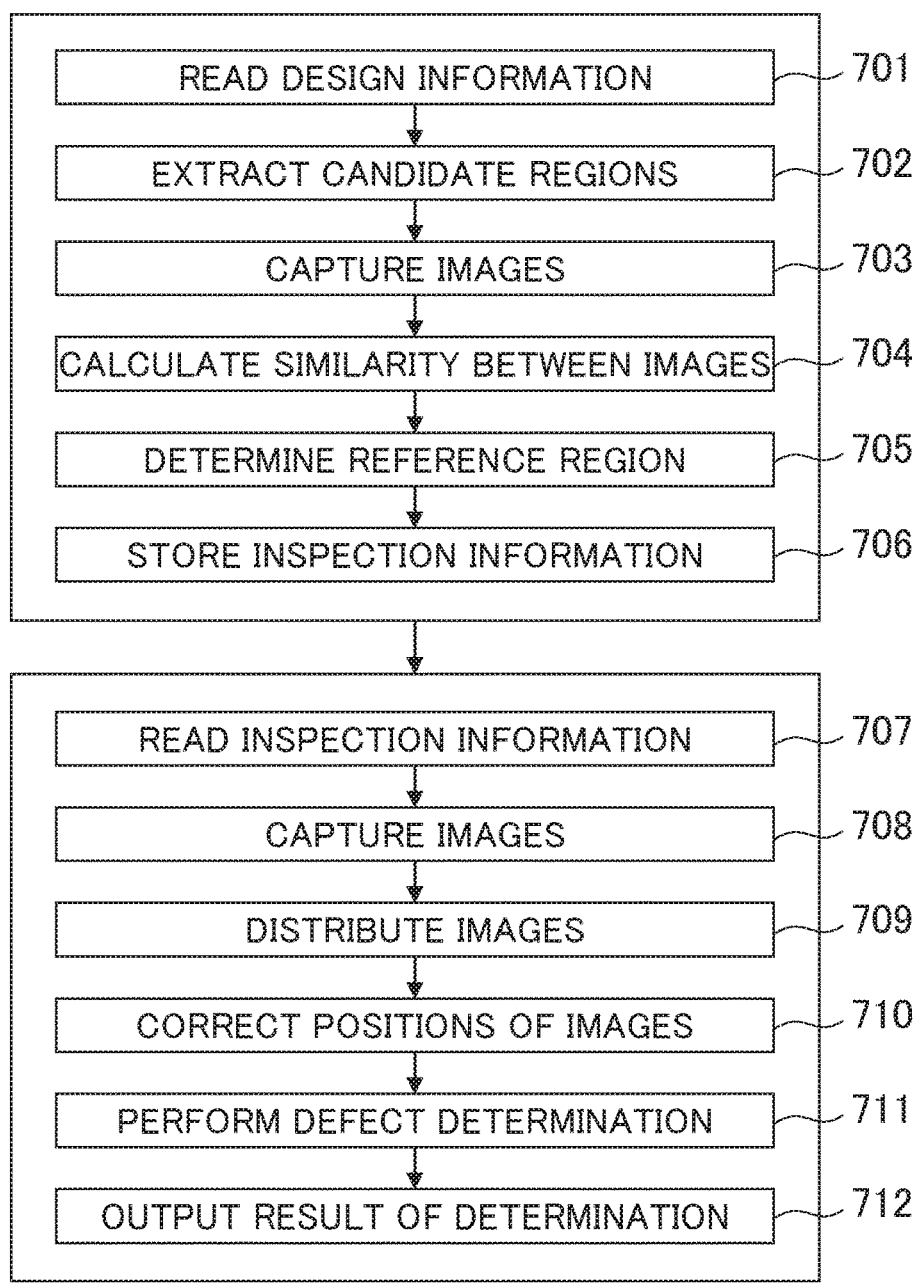
FIG. 7 is a diagram showing an example of a procedure for determination of inspection information and a procedure for defect detection.

FIG. 7 is a diagram showing an example of a procedure for the determination of the inspection information by the defect inspection device and a procedure for defect detection using the inspection information. In the following description, the functional blocks shown in FIGS. 3 and 6 are described as subjects, but processes to be executed by these functional blocks are executed by causing the processor to use the memory or the like to execute a predetermined program, and the processor may be used as a subject.

The determination of the inspection information is described. The design information acquirer 101-1 reads the design information from the storage unit 106 (701). Then, the candidate region extractor 101-2 extracts regions having a repetitive pattern as multiple candidate regions from the design information (702). Then, the image capturer 103 captures images of the multiple candidate regions (703). Then, the similarity calculator 101-3 uses the images of the multiple candidate regions to calculate a similarity between the multiple candidate regions (704). Then, the region determiner 101-4 determines, based on the similarity, a reference region corresponding to a region to be inspected (705). Then, the region determiner 101-4 causes information of a combination of the region to be inspected and the reference region to be stored in the storage unit 106 (706).

The defect detection using the inspection information is described. The inspection information acquirer 102-1 reads the inspection information from the storage unit 106 (707). Then, the image capturer 103 captures images (708). Then, the image distributor 102-2 uses the inspection information to extract an image of the region to be inspected and an image of the reference region from the captured images and distributes the extracted images to the defect determiner 102-3 (709). The defect determiner 102-3 performs positional correction between the image of the region to be inspected and the image of the reference region (710). The defect determiner 102-3 performs the defect determination using the images subjected to the positional correction and indicating the region to be inspected and the reference region (711). The defect determiner 102-3 outputs the result of the defect determination (712).

In this case, the procedure for generating the inspection information in 701 to 706 and the procedure for performing the defect detection in 707 to 712 may not be continuously performed. In addition, in the procedure for generating the inspection information in 701 to 706 and the procedure for performing the defect detection in 707 to 712, the same sample may be used or different samples may be used as long as the same design information is used. In addition, the determination of the reference region (705) may be performed immediately before the distribution of the images (709). In this case, the similarity between the candidate regions is stored as inspection information.

Figure 8:
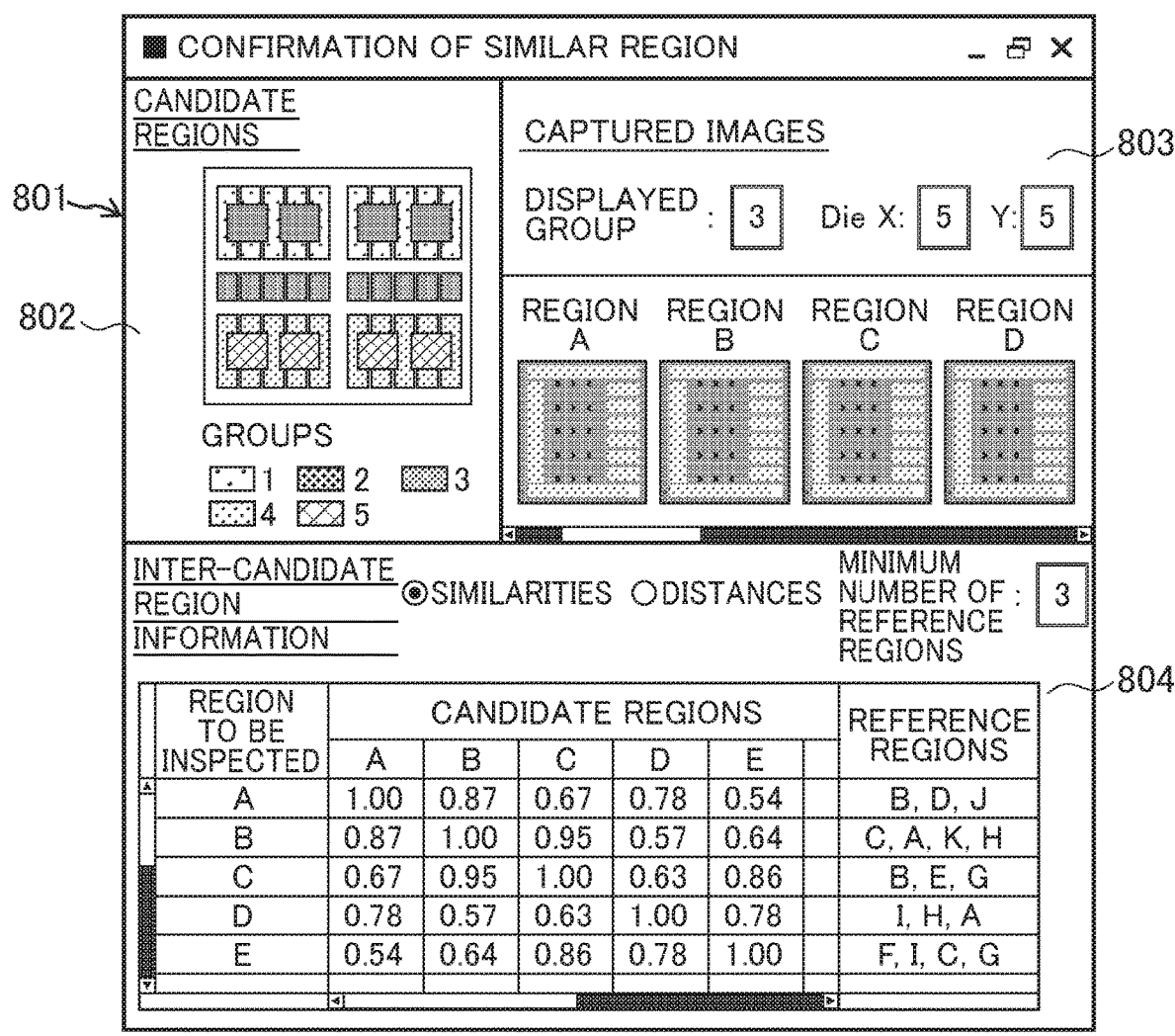
FIG. 8 is a diagram showing an example of a user interface for the inspection information generator.

FIG. 8 is a diagram showing an example of a user interface for the inspection information generator 101. A candidate region confirmation screen 801 is displayed in the output device of the GUI 107. The candidate region confirmation screen 801 includes a design information display section 802, a captured image display section 803, and a candidate region information display section 804.

In the design information display section 802, design information of a die is displayed. In addition, in the design information display section 802, candidate regions extracted from the die are displayed for groups of repetitive patterns. In the example shown in FIG. 8, five repetitive patterns are extracted and information of the groups of the extracted patterns is superimposed and displayed on the design information. As an example, information of the groups is displayed so that the groups are classified based on colors or patterns.

In the captured image display section 803, information of the die and a captured image of a group of selected candidate regions is displayed. The user can enter a group to be displayed via the GUI 107. In the example shown in FIG. 8, a group 3 is selected. In the captured image display section 803, captured images of candidate regions of the specified group 3 are displayed. The user can display captured images of another die in the captured image display section 803 by changing information (index of the die) of the die.

In the candidate region information display section 804, a table of similarities or distances between the candidate regions of the specified group is displayed. In the candidate region information display section 804, the similarities between the candidate regions of the specified group are displayed in a matrix. In addition, when a radio button for distances is selected, the distances between the candidate regions of the specified group are displayed in a matrix in the candidate region information display section 804.

In addition, in the candidate region information display section 804, reference regions corresponding to regions to be inspected are displayed. The user can specify the smallest number of reference regions in the candidate region information display section 804. In this example, since the smallest number of reference regions is set to "3", the region determiner 101-4 determines at least 3 reference regions based on at least either the similarities or distances between the candidate regions. For example, three reference regions (B, D, and J) are determined for a region A to be inspected.

According to the candidate region confirmation screen 801 shown in FIG. 8, the user can visually confirm image similarities and distances between candidate regions. The candidate region confirmation screen 801 may include an interface for enabling the user to modify a reference region while referencing similarities or distances between candidate regions.

Traditionally, even when similar layouts exist in design information, there has been a problem that images used in defect detection are not similar to each other and erroneous information is generated or a defect is overlooked. On the other hand, in the aforementioned example, captured images of candidate regions are acquired and regions to be used as reference images are appropriately set based on a similarity or distance between the candidate regions. As a result, it is possible to prevent erroneous information from being generated and prevent a defect from being overlooked in the defect detection.

Figure 9:
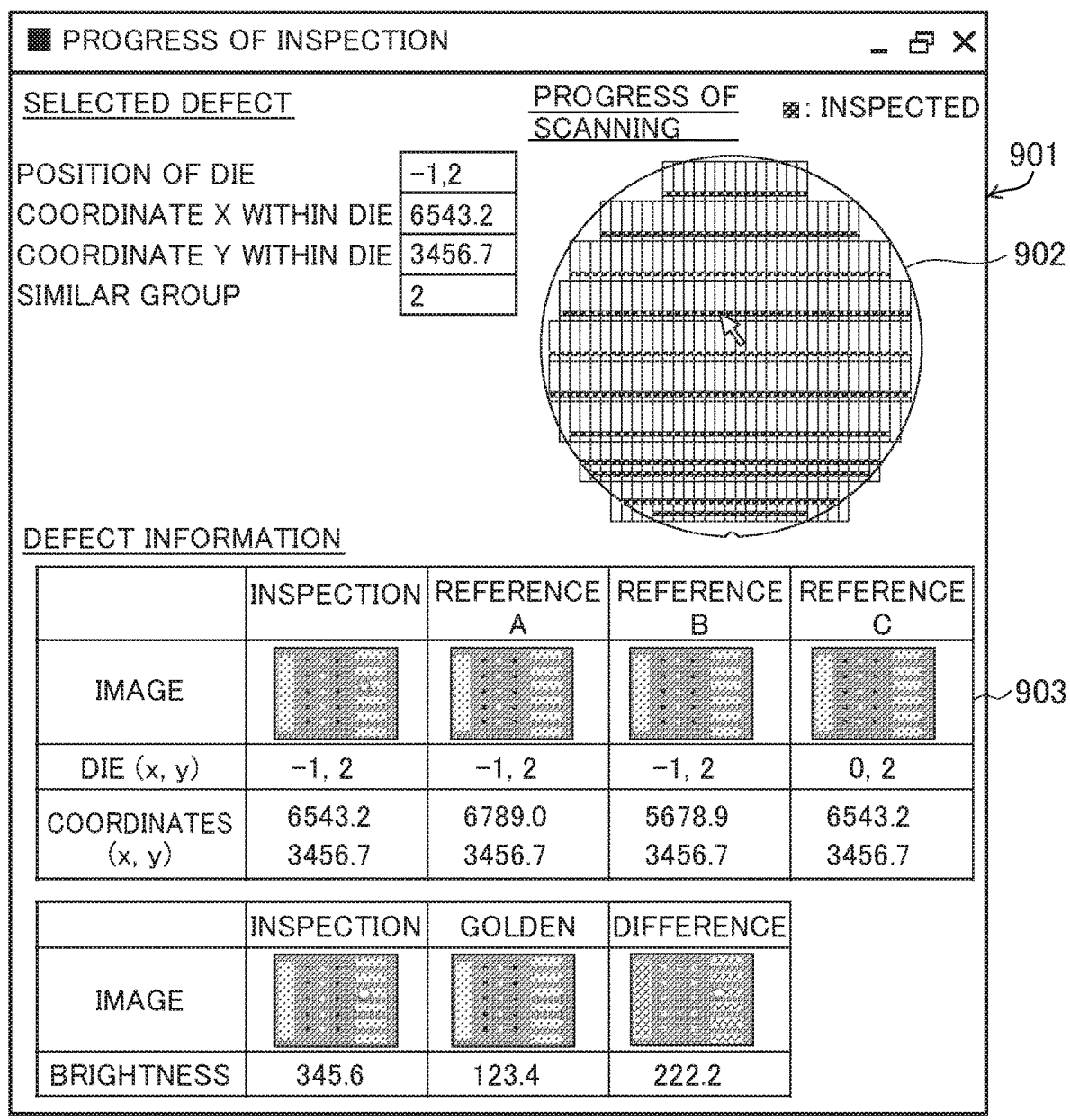
FIG. 9 is a diagram showing an example of a user interface for the defect detector.

FIG. 9 is a diagram showing an example of a user interface for the defect detector 102. A defect detection confirmation screen 901 is displayed in the output device of the GUI 107. In the defect detection confirmation screen 901, the progress of the defect detection based on the inspection information and the result of the defect detection are displayed. The defect detection confirmation screen 901 includes a wafer map display section 902 and a defect information display section 903.

When a predetermined location (inspected location) displayed in the wafer map display section 902 is selected, information (an index of a die, coordinates of the die, and the like) of the die existing at the selected location is displayed and an inspection result is displayed in the defect information display section 903. In the defect information display section 903, information (the index of the die, information on the coordinates, and captured images) on regions to be inspected and information (the index of the die, information on the coordinates, and captured images) on reference regions are displayed. In addition, in the defect information display section 903, a golden image and a differential image that are results of the process by the defect detector 102 may be displayed.

According to this configuration, the user can confirm patch images of the regions to be inspected and the reference regions, and a golden image and a differential image that are results of the process by the defect determiner. In addition, the index of the die and coordinates within the die can be confirmed as the positions of the regions to be inspected and the positions of the reference regions.

Second Embodiment

Figure 10A:
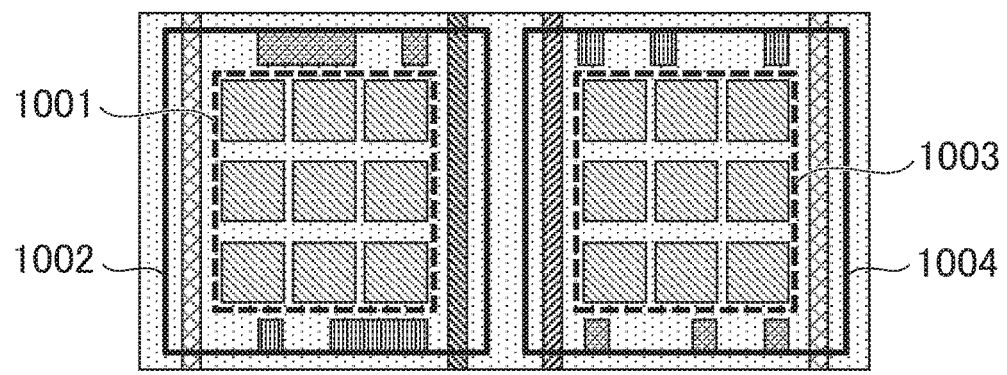
FIG. 10A is a diagram showing an example of shift correction of candidate regions.
Figure 10B:
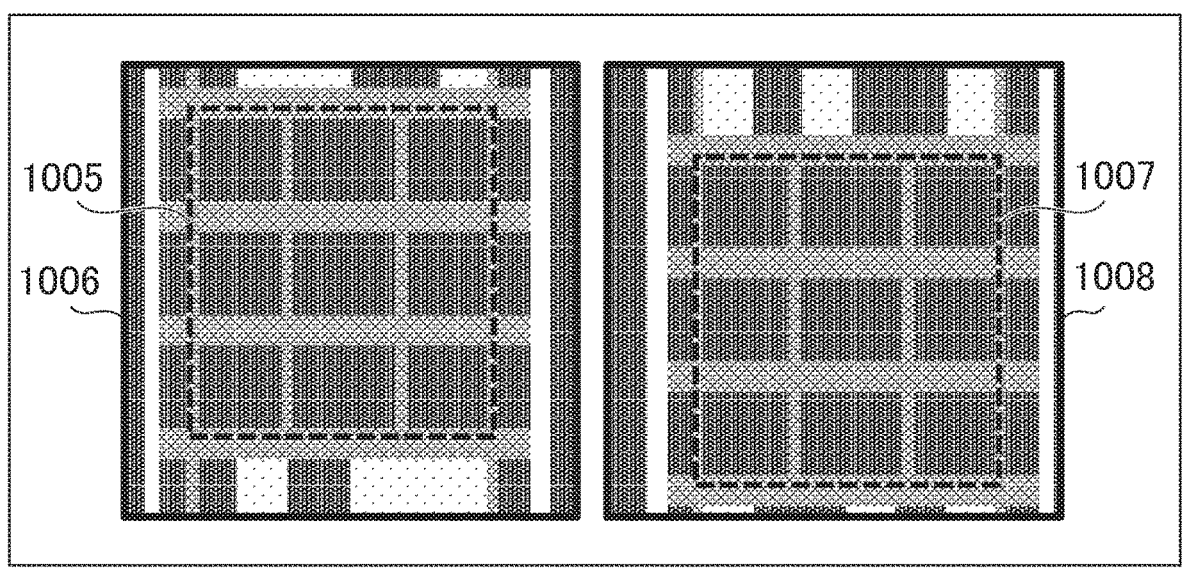
FIG. 10B is a diagram showing the example of the shift correction of the candidate regions.

FIGS. 10A and 10B are diagrams showing an example of shift correction of candidate regions. A positional error between captured images of multiple candidate regions may occur depending on an adjusted state of the stage and adjusted states of the optical systems. Since a similarity between captured images including a positional error is lower than the actual similarity, the similarity calculator 101-3 may correct the positions of the captured images of candidate regions before calculating the similarity.

The image capturer 103 captures images of regions wider than candidate regions (1001 and 1003) extracted based on the design information. As an example, the image capturer 103 images regions (1002 and 1004) wider by an estimated maximum error (FIG. 10A). In this case, a captured image corresponding to the region 1002 is indicated by 1006, and a captured image corresponding to the region 1004 is indicated by 1008 (FIG. 10B). The similarity calculator 101-3 corrects the positions of candidate regions (1005 and 1007) within the captured images (1006 and 1008) of the wide regions.

The similarity calculator 101-3 may adjust the positions while shifting the positions from the captured images (1006 and 1008) so that a similarity between the extracted candidate region images (1005 and 1007) is highest, and the similarity calculator 101-3 may treat the similarity obtained at the positions as the similarity between the candidate regions. In addition, as another example, the similarity calculator 101-3 may calculate the similarity using partial images extracted from the captured images (1006 and 1008).

Third Embodiment

Figure 11:
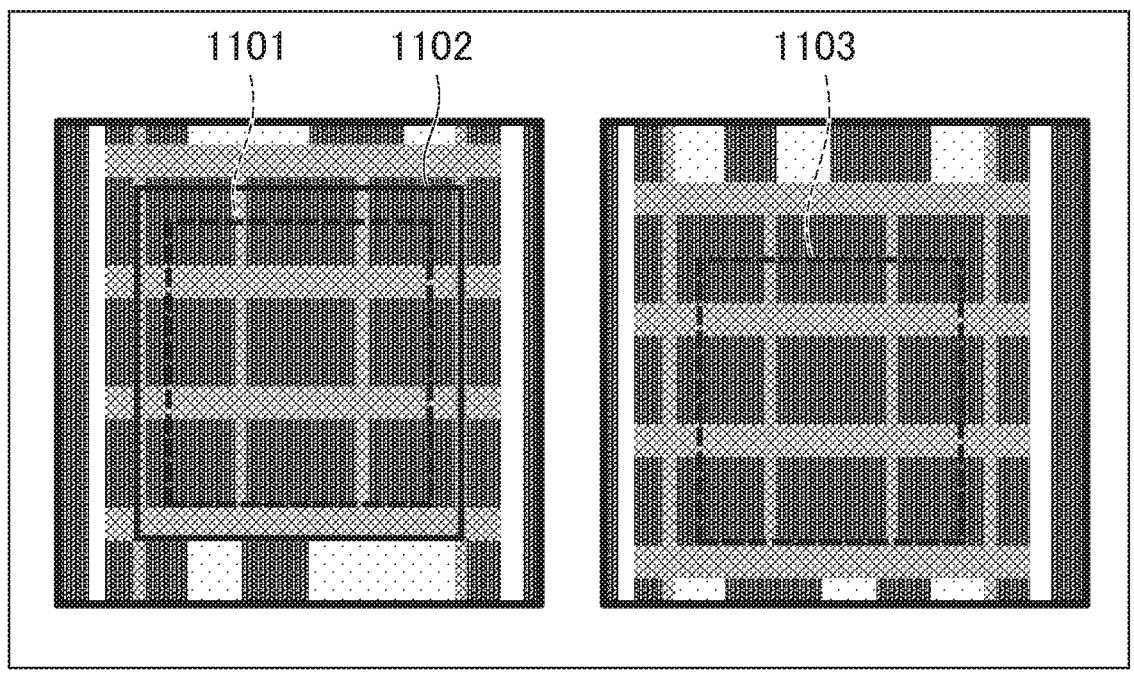
FIG. 11 is a diagram showing an example of a method for correcting an image shift in the defect detector.

FIG. 11 is a diagram showing an example of a method for reducing an image shift in the defect detector 102. The image distributor 102-2 extracts an image of a region to be inspected and an image of a reference region, but actually extracted image regions may be shifted from image regions to be extracted, depending on the adjusted state of the stage and the adjusted states of the optical systems. An image including a region other than the original region to be inspected or the original reference region may include a region having a dissimilar pattern. This causes erroneous detection in a defect detection method for detecting, as a defect, an unmatched portion between an image to be inspected and a reference image.

To solve this problem, the image distributor 102-2 may extract a region narrower by an estimated shifted amount with respect to the image of the region to be inspected or the image of the reference region For example, the image distributor 102-2 extracts a region 1101 narrower by the estimated shifted amount from an image 1102 of the region to be inspected. In addition, the image distributor 102-2 extracts a region 1103 corresponding to the extracted region 1101 from the image of the reference region. The image distributor 102-2 transfers the extracted regions 1101 and 1103 to the defect determiner 102-3. The defect determiner 102-3 performs defect detection using a partial image of the image of the region to be inspected and a partial image of the image of the reference region. Thus, even when an actually extracted image region is shifted from an image region to be extracted, it is possible to prevent erroneous detection.

Fourth Embodiment

Figure 12A:
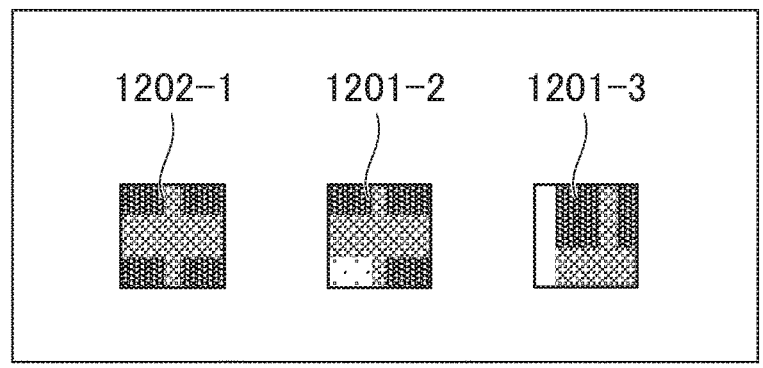
FIG. 12A is a diagram showing an example of a method for correcting a shift between an image of a region to be inspected and an image of a reference region.
Figure 12B:
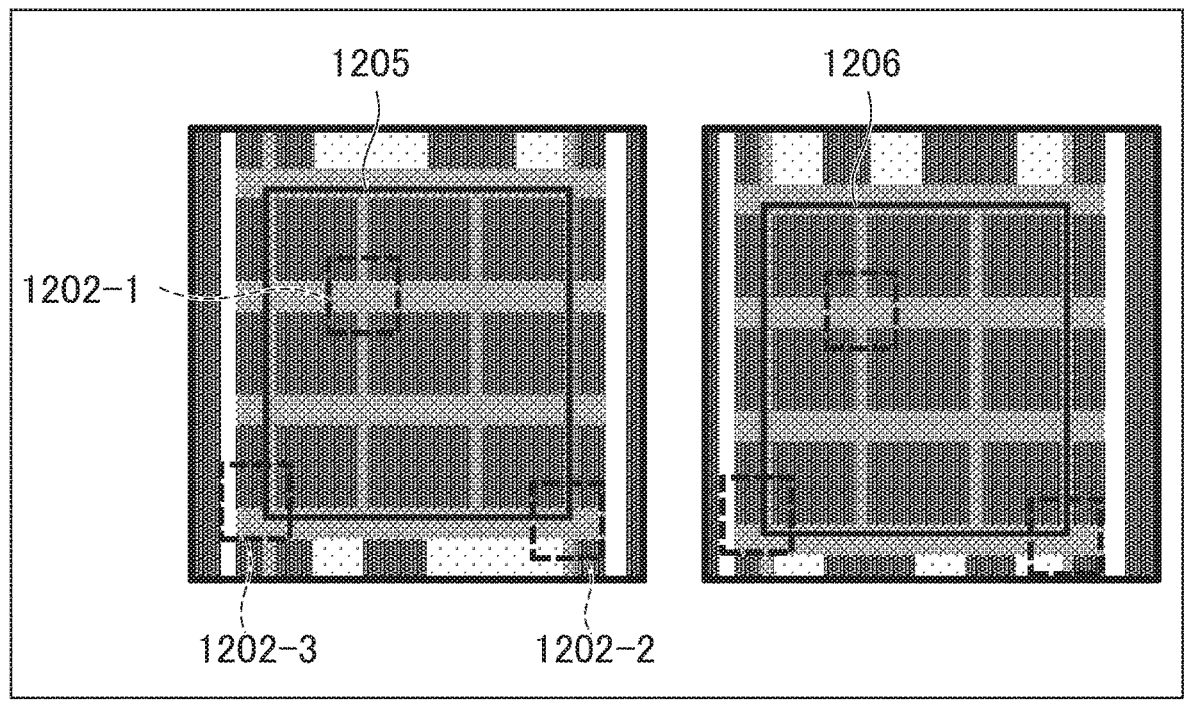
FIG. 12B is a diagram showing the example of the method for correcting the shift between the image of the region to be inspected and the image of the reference region.

FIGS. 12A and 12B are diagrams showing an example of a method for correcting a shift between the image of the region to be inspected and the image of the reference region. The region determiner 101-4 causes partial images (1201-1, 1201-2, and 1201-3) existing in or near a determined region to be inspected and a determined reference region and positional information of the partial images to be stored as a portion of the inspection information to be stored in the storage unit 106 (FIG. 12A).

The image distributor 102-2 positions images captured by the image capturer 103 and the partial images stored in the storage unit 106 (1202-1, 1202-2, and 1202-3). The image distributor 1202-2 transfers, to the defect determiner 102-3, a region 1205 that is to be inspected and has been subjected to the positional correction based on acquired shifted amounts and the positional information of the partial images. Similarly, the image distributor 102-2 transfers, to the defect determiner 102-3, a reference region 1206 subjected to the positional correction based on shifted amounts acquired based on the positioning of the images captured by the image capturer 103 and the partial images and the positional information of the partial images.

The partial images may be selected from locations at which patterns such as edges exist, and the positional information of the partial images may be information indicating relative positional relationships between the region to be inspected and the reference region and the partial images.

Fifth Embodiment

Figure 13:
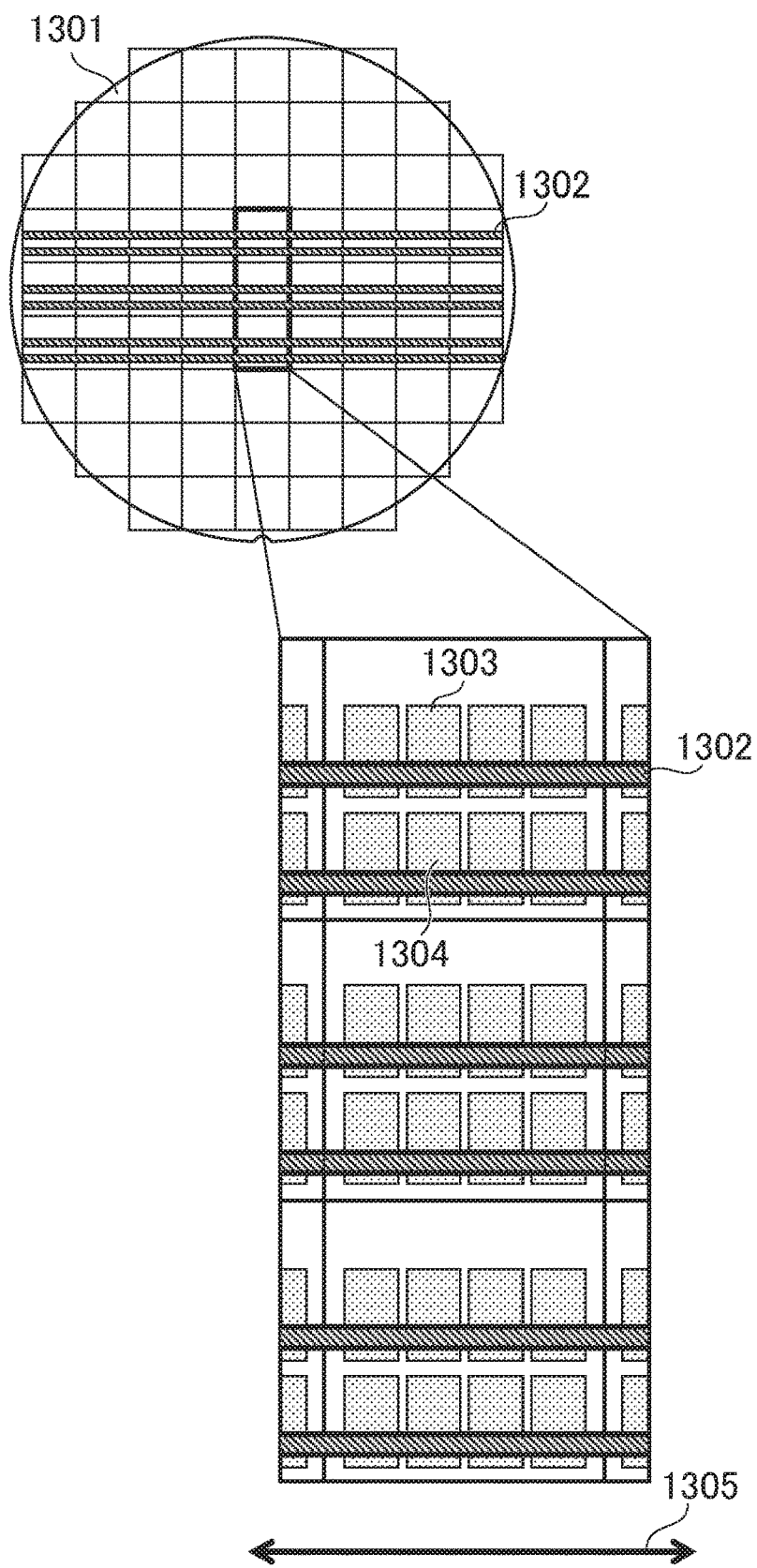
FIG. 13 is a diagram showing an example of the adjustment of a scanning position.

FIG. 13 is a diagram showing an example of the adjustment of a scanning position. The image capturer 103 changes a scanning interval based on the position of the region to be inspected and the position of the reference region. The image capturer 103 may adjust the scanning interval so that a scanned position of the region to be inspected substantially matches a scanned position of the reference region. For example, the image capturer 103 may adjust a scanning position 1302 so that the scanning position 1302 is at the same position on both of a region 1303 to be inspected and a reference region 1304. When the reference region 1304 corresponding to the region 1303 to be inspected exists in a direction perpendicular to a scanning direction 1305, an image of the region 1303 to be inspected and an image of the reference region 1304 can be extracted from images obtained based on the adjustment of the scanning position 1302 in the scanning of the regions.

When the aforementioned adjustment is performed, a process of connecting images obtained in the scanning performed multiple times is not necessary and the efficiency of the inspection is improved. In addition, positions corresponding to a region to be inspected and a reference region can be imaged at the same positions of fields of view of the image sensors, the defect determination can be performed without being affected by variations in the sensitivity of the image sensors in the fields of view, variations in the intensities of the illumination of the image sensors in the fields of view, and the like.

Sixth Embodiment

Figure 14:
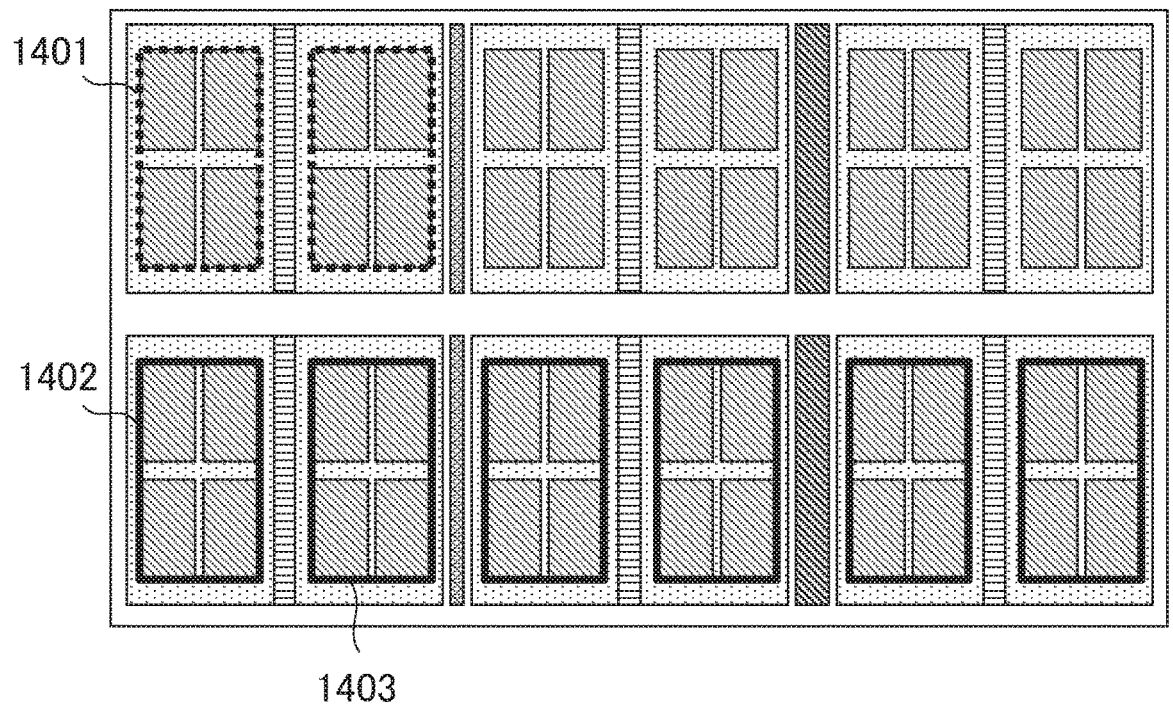
FIG. 14 is a diagram showing an example of an improvement in the efficiency of the extraction of candidate regions.

FIG. 14 is a diagram showing an example of an improvement of the efficiency of the extraction of candidate regions. When a time period for the extraction of candidate regions needs to be reduced, the candidate region extractor 101-2 may limit candidate regions to candidate regions existing in a horizontal direction or a vertical direction and search the candidate regions existing in the horizontal direction or the vertical direction. Thus, the candidate regions can be efficiently extracted. As an example, the candidate region extractor 101-2 may not treat, as a region to be searched, a region 1401 existing in a vertical direction with respect to a region 1402 and may extract, as a candidate region, only a region 1403 existing in a horizontal direction with respect to the region 1402.

Seventh Embodiment

Figure 15:
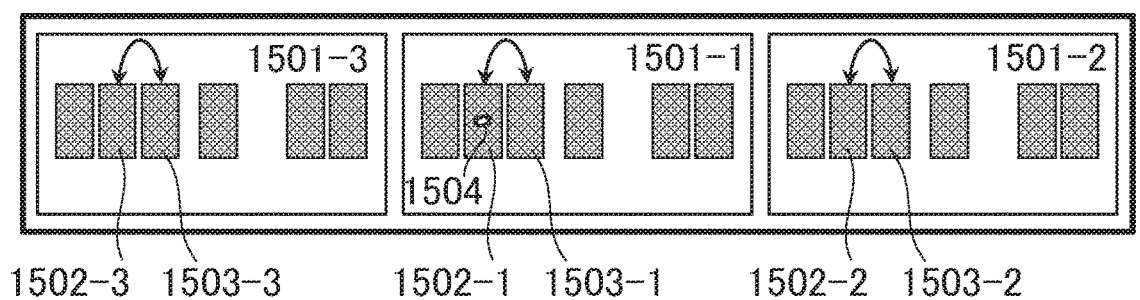
FIG. 15 is a diagram showing an example of similarity calculation.

FIG. 15 is a diagram showing an example of the calculation of a similarity when a defect exists in a candidate region. When the similarity calculator 101-3 calculates a similarity between candidate regions 1502-1 and 1503-1 within a die 1501, the similarity is affected by a defect 1504, and the similarity between the candidate regions 1502-1 and 1503-1, which are originally similar to each other, may be calculated to be low.

Thus, the similarity calculator 101-3 may calculate a similarity between candidate regions 1502-2 and 1503-2 located at the same positions in a section (adjacent die 1501-2) different from the section (die 1501-1) including the candidate regions 1502-1 and 1503-1, and calculate a similarity between candidate regions 1502-3 and 1503-3 located at the same positions in a section (adjacent die 1501-3) different from the section (die 1501-1) including the candidate regions 1502-1 and 1503-1. The similarity calculator 101-3 may output, as a similarity, a representative value among the similarity calculated for the die 1501-1, the similarity calculated for the die 1501-2, and the similarity calculated for the die 1501-3. For example, the similarity calculator 101-3 may output the maximum similarity among multiple similarities as a representative similarity between candidate regions. In addition, as another example, to reduce an effect of a defect, the similarity calculator 101-3 may calculate an average image of multiple dies in advance and calculate a similarity between candidate regions for the average image.

1504 is not limited to the defect, and the similarities can be calculated using the aforementioned method even when the similarities are reduced due to electric noise or a failure of the positioning.

Eighth Embodiment

Figure 16A:
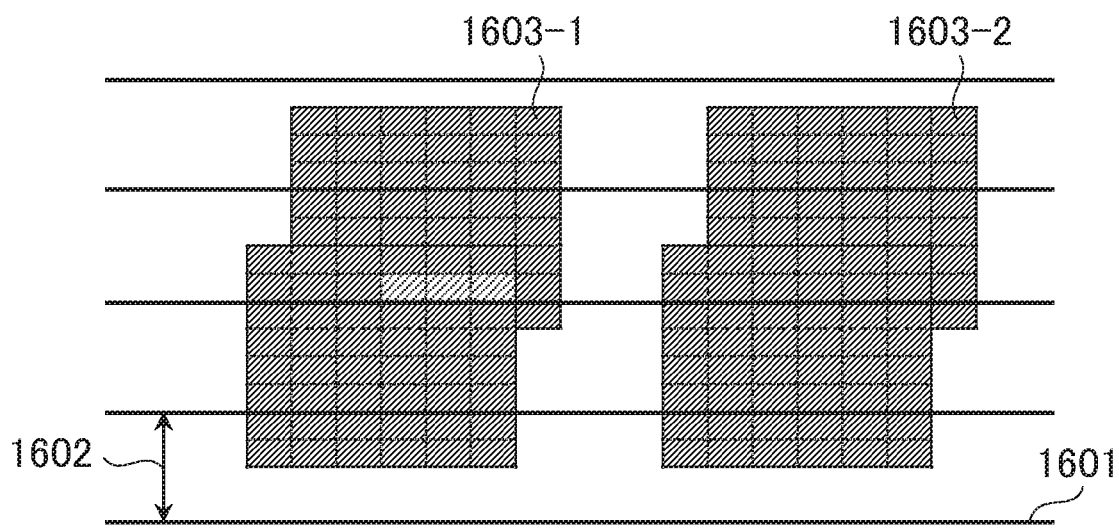
FIG. 16A is a diagram showing an example of similarity calculation that does not depend on the scanning position.
Figure 16B:
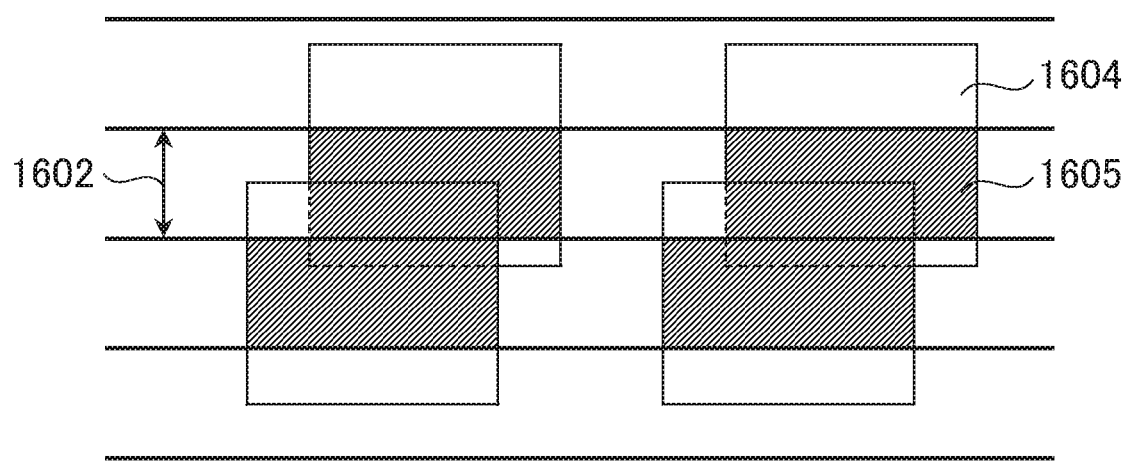
FIG. 16B is a diagram showing an example of the similarity calculation that does not depend on the scanning position.

FIGS. 16A and 16B are diagrams showing an example of the calculation of a reference region that is hardly affected by a variation in the scanning position. Straight lines 1601 shown in FIG. 16A indicate boundaries of the scanning 1602 indicates a width of the scanning 1603-1 and 1603-2 indicate candidate regions.

The similarity calculator 101-3 may divide each of the candidate regions into regions (for example, small regions, each of which has a width of 64 pixels while the width of the scanning is 1024 pixels) smaller than the width of the scanning and calculate similarities between the regions. In FIG. 16A, the candidate regions 1603-1 and 1603-2 are divided into regions smaller than the width 1602 of the scanning. Thus, even when a similar candidate region and a region that is not a similar candidate region exist in a mixed manner within a field of view in the vertical direction in a single scan, a region as wide as possible can be determined as a similar region. As shown in FIG. 16B, when the width 1602 of the scanning is used as the minimum unit for the similarity calculation, only a region 1605 included in a candidate region 1604 and indicated by oblique lines are similar to another candidate region, depending on the scanning position. To secure robustness against a shift between corresponding small regions, adjacent small regions may overlap each other.

In addition, the similarity calculator 101-3 may cause similarities of the small regions to be stored as inspection information in the storage unit 106. The image distributor 102-2 may extract images of regions to be inspected and images of reference regions based on the similarities of the small regions and transfer the extracted regions to the defect determiner 102-3.

In this way, the similarities are calculated using the small regions in consideration of the width of the scanning, thereby reference regions are determined. Due to this, even when the scanning positions differ between when the similarity calculation is conducted and when the inspection is conducted, the defect determination can be performed using, as reference regions, a similar region that is as wide as possible within the die. In addition, even when the scanning position is changed based on a change (for example, a change in a region that is not to be inspected and located at a die edge) in a region to be inspected after the generation of the inspection information, the inspection information does not need to be modified.

Although the determination of the scanning position and the reference regions in the generation of the inspection is described above, the determination is not limited to this. A combination of a region to be inspected and a reference region may be determined for each of regions smaller than the width of the scanning based on the scanning position upon the defect detection, and the defect determination may be performed using the determined combination.

Ninth Embodiment

Figure 17:
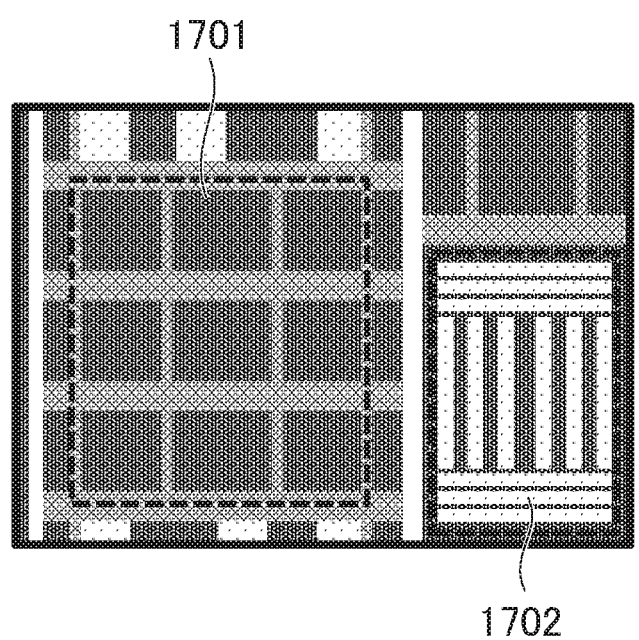
FIG. 17 is a diagram showing an example of the determination of a reference region for each of groups of candidate regions.

FIG. 17 is a diagram showing an example of region determination for each group of candidate regions. Although the region determiner 101-4 determines a reference region corresponding to a region to be inspected, based on a similarity between candidate regions, a method for determining the reference region and a method for determining the number of reference regions are described below. When candidate regions 1701 and 1702 belonging to repetitive groups of different patterns exist, the region determiner 101-4 may determine different numbers of reference regions based on noise characteristics of the groups, characteristics of the patterns, and the like.

The method for determining the number of reference regions and determining reference regions may be performed using similarities as described above or may be performed based on the variance or standard deviation of multiple candidate regions, densities of wirings within candidate regions, distances between candidate regions, the positions of candidate regions within a die or a wafer, or the like. The information may be stored as inspection information in the storage unit 106. In addition, the region determiner 101-4 may determine different numbers of reference regions for the small regions shown in 16A.

The device according to the aforementioned first to ninth embodiments includes the design information acquirer 101-1 configured to acquire design information of a sample to be inspected, the candidate region extractor 101-2 configured to use the design information to extract multiple candidate regions, the image capturer 103 configured to capture images of the multiple candidate regions, the similarity calculator 101-3 configured to calculate similarities or distances between the multiple candidate regions, and the region determiner 101-4 configured to determine, as inspection information, at least one reference region corresponding to a region to be inspected. According to this configuration, the defect inspection method and the defect inspection device that inspect a fine defect existing on a surface of the sample can use, as a reference image, a similar region formed in the same die or an adjacent die, thereby enabling the defect inspection to be performed with high sensitivity.

The present invention is not limited to the aforementioned embodiments and includes various modified examples. The aforementioned embodiments are described in detail in order to describe the present invention in a comprehensive fashion and are not limited to the embodiments in which all the aforementioned configurations are included. In addition, a portion of a configuration described in a certain embodiment can be replaced with a configuration described in another embodiment. In addition, a configuration described in a certain embodiment can be added to a configuration described in another embodiment. In addition, for a portion of the configurations described in the embodiments, a configuration can be added, deleted, or replaced.

For example, in the aforementioned embodiments, the dark-field inspecting device is described as the inspection device. The aforementioned embodiments, however, can be applied to inspecting devices of all schemes such as a bright-field inspecting device, a SEM inspecting device, and the like, images can be acquired by the inspecting devices of the aforementioned schemes as multiple image acquisition requirements, and the defect determination can be performed.

The functions of the aforementioned processing units and the like may be enabled using software by causing the processor to interpret and execute a program enabling the functions. Information of the program that enables the functions, the table, files, and the like can be stored in non-transitory computer-readable media of various types. As the non-transitory computer-readable media, for example, a flexible disk, a CD-ROM, a DVD-ROM, a hard disk, an optical disc, magneto-optical disc, a CD-R, a magnetic table, a nonvolatile memory card, a ROM, and the like are used. In addition, the functions of the aforementioned processing units and the like may be enabled using hardware by designing a portion or all of the functions and the like with, for example, an integrated circuit.

In addition, control lines and information lines that are considered to be necessary for the description are shown, and all control lines and information lines for the products are not necessarily shown. Actually, it may be considered that almost all the configurations are connected to each other.

LIST OF REFERENCE SIGNS

101 . . . Inspection information generator
101-1 . . . Design information acquirer
101-2 . . . Candidate region extractor
101-3 . . . Similarity calculator
101-4 . . . Region determiner
102 . . . Defect detector
102-1 . . . Inspection information acquirer
102-2 . . . Image distributor
102-3 . . . Defect determiner
103 . . . Image capturer
104 . . . Communication bus
105 . . . Controller
106 . . . Storage unit
107 . . . GUI
210 . . . Sample
220 . . . Stage
230 . . . Mechanical controller
240-1, 240-2 . . . Illuminator
250-1 . . . Upward detection system
250-2 . . . Oblique detection system
251 . . . Spatial frequency filter
252 . . . Analyzer
260-1, 260-2 . . . Image sensor
270-1, 270-2 . . . AD circuit
280 . . . Image buffer

The invention claimed is:

1. An inspection information generation device comprising:
a processor configured to
acquire design information of a sample to be inspected;
extract multiple candidate regions using the acquired design information;
capture images of the multiple candidate regions;
perform a similarity calculation using the extracted images of the multiple candidate regions by calculating a similarity or distance between the multiple candidate regions; and
determine, as inspection information, one or more reference regions each corresponding to a same region to be inspected based on the similarity or the distance,
wherein a minimum number specifying how many of said one or more reference regions is to be determined for said region to be inspected is received via user input, and
wherein the processor is further configured to extract, as the inspection information, a partial image existing in or near the region to be inspected and a partial image existing in or near the reference region, each said partial image having an area less than said region to be inspected and including one or more edge patterns of said region to be inspected.

2. The inspection information generation device according to claim 1,
wherein the processor is further configured to calculate an average image of a plurality of sections including sections which include the region to be inspected, and to calculate a similarity of the average image and the candidate region.

3. The inspection information generation device according to claim 1,
wherein the processor is further configured to use partial images of the candidate regions to perform the similarity calculation.

4. The inspection information generation device according to claim 1,
wherein the processor is further configured to capture images of regions wider than the candidate regions, and
wherein the processor is further configured to correct the positions of the candidate regions in the images of the wider regions in performing said similarity calculation.

5. The inspection information generation device according to claim 1,
wherein the processor is further configured to limit directions in which the candidate regions are extracted to a single direction and is configured to extract the candidate regions.

6. The inspection information generation device according to claim 1,
wherein the processor is further configured to perform said similarity calculation between the plurality of candidate regions extracted from a first section, and between the plurality of candidate regions extracted from a second section different from the first section, and from the same position as the plurality of candidate regions extracted from the first region are calculated; and
determine the reference region using the similarity between the candidate regions in the first section, and the similarity between the candidate regions of the second section.

7. The inspection information generation device according to claim 1,
wherein the processor is further configured to divide each of the candidate regions into regions smaller than a width of scanning and use the divided regions to perform the similarity calculation.

8. The inspection information generation device according to claim 1,
wherein the processor is further configured to determine different numbers of reference regions for groups of the candidate regions.

9. A defect inspection device comprising:
a first processor configured to
acquire design information of a sample to be inspected;
extract multiple candidate regions using the acquired design information;
capture images of the multiple candidate regions;
perform a similarity calculation using the extracted images of the multiple candidate regions by calculating a distance between the multiple candidate regions; and
determine, as inspection information, one or more reference regions each corresponding to a region to be inspected based on the similarity calculation, wherein a minimum number specifying how many of said one or more reference regions is to be determined for said region to be inspected is received via user input;
and a second processor configured to perform defect detection,
wherein the first processor is further configured to extract, as the inspection information, a partial image existing in or near the region to be inspected and a partial image existing in or near the reference region, each said partial image having an area less than said region to be inspected and including one or more edge patterns of said region to be inspected,
wherein the first processor is further configured to use the inspection information to capture a first image of the region to be inspected and a second image of the one or more reference regions, and
wherein the second processor is further configured to use the first image and the second image to perform the defect detection.

10. The defect inspection device according to claim 9,
wherein the second processor is further configured to use a partial image of the first image and a partial image of the second image to perform the defect detection.

11. The defect inspection device according to claim 9,
wherein a storage device stores the inspection information, and
wherein the defect detector is configured to use the partial image of the region to be inspected and the partial image of the reference region to correct the position of the first image and the position of the second image.

12. The defect inspection device according to claim 9,
wherein the first processor adjusts a scanning interval so that a scanned position of the region to be inspected substantially matches a scanned position of the one or more reference regions.

13. An inspection information generation method comprising:
a step of acquiring design information of a sample to be inspected;
a step of extracting multiple candidate regions using the design information;
a step of capturing images of the multiple candidate regions;
a step of calculating a similarity using the images of the multiple candidate regions to calculate a similarity or distance between the multiple candidate regions; and
a step of determining, as inspection information, one or more reference regions each corresponding to a region to be inspected using the similarity or distance,
wherein said step of extracting multiple design candidate region further comprises extracting, as the inspection information, a partial image existing in or near the region to be inspected and a partial image existing in or near the reference region, each said partial image having an area less than said region to be inspected and including one or more edge patterns of said region to be inspected, and
wherein a minimum number specifying how many of said one or more reference regions is to be determined for said region to be inspected is received via user input.

\* \* \* \* \*